United States Patent
White et al.

(10) Patent No.: US 9,590,768 B2
(45) Date of Patent: Mar. 7, 2017

(54) METHOD, RECEIVER DEVICE, NETWORK NODE AND MOBILE COMMUNICATION TERMINAL FOR DECODING TRANSMISSIONS

(75) Inventors: George White, Sollentuna (SE); Ning He, Sollentuna (SE); Niklas Johansson, Uppsala (SE); Cagatay Konuskan, Linköping (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 93 days.

(21) Appl. No.: 14/397,889

(22) PCT Filed: May 4, 2012

(86) PCT No.: PCT/SE2012/050466
§ 371 (c)(1),
(2), (4) Date: Oct. 30, 2014

(87) PCT Pub. No.: WO2013/165290
PCT Pub. Date: Nov. 7, 2013

(65) Prior Publication Data
US 2015/0131760 A1    May 14, 2015

(51) Int. Cl.
*H04L 27/06* (2006.01)
*H04L 1/00* (2006.01)
(Continued)

(52) U.S. Cl.
CPC .............. *H04L 1/005* (2013.01); *H04B 1/10* (2013.01); *H04J 11/004* (2013.01); *H04L 1/1812* (2013.01)

(58) Field of Classification Search
CPC .......... H03M 13/1111; H03M 13/1102; H03M 13/19; H03M 13/6511; H03M 13/6513; H03M 13/3707; H04L 1/0057; H04L 1/005
(Continued)

(56) References Cited

U.S. PATENT DOCUMENTS

| | | | |
|---|---|---|---|
| 2010/0067435 A1* | 3/2010 | Balachandran | H04L 5/0035 370/328 |
| 2011/0041023 A1* | 2/2011 | Shimezawa | H04L 1/1819 714/748 |
| 2012/0134305 A1* | 5/2012 | Damnjanovic | H04L 1/1607 370/280 |

FOREIGN PATENT DOCUMENTS

| | | |
|---|---|---|
| EP | 2 247 018 A1 | 11/2010 |
| EP | 2 299 602 A1 | 3/2011 |

OTHER PUBLICATIONS

International Search Report for International Application No. PCT/SE2012/050466 mailed Dec. 7, 2012, 5 pages.
(Continued)

*Primary Examiner* — Leila Malek
(74) *Attorney, Agent, or Firm* — Myers Bigel, P.A.

(57) ABSTRACT

A method, performed in a receiver device, for decoding transmissions of a set of coded information bits from a transmitter. The method includes deriving received symbols from first received data and second received data. The received symbols are converted to sets of soft coded bit estimates. The sets of soft coded bit estimates are combined to form a combined set of soft coded bit estimates. The combined set of soft coded bit estimates are decoded to form a set of soft information bit estimates. The set of soft information bit estimates are converted to form a set of binary bits. A determination is made whether the set of binary bits has been correctly or incorrectly decoded. Inter-
(Continued)

ference cancellation is performed on the received data, and the method is repeated until either the set of binary bits has been correctly decoded or a predefined maximum number of iterations is reached.

17 Claims, 7 Drawing Sheets

(51) Int. Cl.
 *H04L 1/18* (2006.01)
 *H04J 11/00* (2006.01)
 *H04B 1/10* (2006.01)

(58) Field of Classification Search
 USPC ........ 375/262, 340; 714/758, 780, 752, 794, 714/795
 See application file for complete search history.

(56) References Cited

OTHER PUBLICATIONS

Written Opinion of the International Searching Authority for International Application No. PCT/SE2012/050466 mailed Dec. 7, 2012, 9 pages.

Miki et al: "Multipath interference canceller using soft-decision replica combined with hybrid ARQ in W-CDMA forward link", IEEE 54$^{th}$ Vehicular Technology Conference. VTC Fall 2001. Proceedings Oct. 7-11, 2001 Atlantic City, NJ, USA. (cat. No. 01CH37211) IEEE Piscata, vol. 3, Oct. 7, 2001; pp. 1922-1926.

Okuyama et al: "Iterative MMSE Detection and Interference Cancellation for Uplink SC-FDMA MIMO using HARQ", Communications (ICC), 2011 IEEE International Conference on (vol. 1) Jun. 5-9, 2011, Kyoto, Japan; pp. 1-5.

Assimi et al: "Packet combining for turbo-diversity in HARQ systems with integrated turbo-equalization", Turbo Codes and Related Topics, 2008 5$^{th}$ International Symposium on Sep. 1-5, 2008, Lausanne, Switzerland, pp. 61-66.

Hou et al: "Implementing Interference Cancellation to Increase the EV-DO Rev A Reverse Link Capacity", Communications Magazine, IEEE vol. 44, Issue 2, Feb. 13, 2006; pp. 58-64.

Sambhwani et al: "Uplink Interference Cancellation in HSPA: Principles and Practice" May 30, 2012, Qualcomm Inc., XP055112132, pp. 1-28.

Tüchler et al: "Minimum Mean Squared Error Equalization Using A Priori Information", Signal Processing, IEEE Transactions on vol. 50, Issue 3, Mar. 2002, pp. 673-683.

\* cited by examiner

Fig. 6 and # METHOD, RECEIVER DEVICE, NETWORK NODE AND MOBILE COMMUNICATION TERMINAL FOR DECODING TRANSMISSIONS

CROSS REFERENCE TO RELATED APPLICATION

This application is a 35 U.S.C. §371 national stage application of PCT International Application No. PCT/SE2012/050466, filed on 4 May 2012, the disclosure and content of which is incorporated by reference herein in its entirety. The above-referenced PCT International Application was published in the English language as International Publication No. WO 2013/165290 A1 on 7 Nov. 2013.

TECHNICAL FIELD

The invention relates to receiving and decoding transmissions of a set of coded information bits.

BACKGROUND

Broadband single carrier digital communications receivers often employ both channel equalization and channel decoding to counteract the inter-symbol interference (ISI) caused by time-dispersive channel distortion.

Even so, in severe noise or fading conditions, received information bits may still be in a corrupted state after channel decoding, in which case the receiver may request that a packet is retransmitted, through an Automatic Retransmission Query (ARQ) procedure. In the simplest form of ARQ, the transmitted packet contains error detection bits such that, on detection of an error by the receiver's cyclic redundancy check (CRC), the packet is retransmitted, re-equalized and re-decoded, until the receiver's error detection process identifies that correct decoding has occurred. This retransmission is typically performed up to maximum number of times or a maximum time delay.

When forward error correction (FEC) bits are included in the transmission as well as error detection bits, the retransmission procedure is typically referred to as hybrid-ARQ (HARQ). Hybrid-ARQ can achieve additional performance gain by the soft combining of received coded bits over time (i.e. over multiple retransmissions) in a soft-coded-bit buffer—or HARQ buffer—prior to the decoding stage.

The article by Okuyama et al., "Iterative MMSE Detection and Interference Cancellation for Uplink SC-FDMA MIMO using HARQ", Proc. of IEEE International Conference on Communications (ICC 2011), Jun. 5-9 2011, Kyoto, Japan, discusses the use of HARQ and interference cancellation. However, the solution of this article is only applicable to chase combining HARQ.

SUMMARY

It is an object to provide a solution for interference cancellation which is applicable to both chase combining HARQ and incremental redundancy HARQ, when receiving transmissions from one or multiple transmitters.

In a first aspect it is presented a method, performed in a receiver device, for decoding transmissions of a set of coded information bits from a transmitter. The method comprises the steps of: deriving a first set of received symbols from first received data corresponding to a first transmission, the first received data being stored in an antenna buffer; deriving a second set of received symbols from second received data corresponding to a second transmission, the second received data being stored in the antenna buffer; converting the first set of received symbols to a first set of soft coded bit estimates; converting the second set of received symbols to a second set of soft coded bit estimates; combining the first set of soft coded bit estimates and the second set of soft coded bit estimates to a combined set of soft coded bit estimates; decoding the combined set of soft coded bit estimates to a set of soft information bit estimates; converting the set of soft information bit estimates to a set of binary bits; determining whether the set of binary bits has been correctly or incorrectly decoded; performing interference cancellation on the first received data in the antenna buffer; performing interference cancellation on the second received data in the antenna buffer; and repeating the mentioned steps until either the set of binary bits has been correctly decoded or a predefined maximum number of iterations is reached. In this method, where it is possible to perform interference cancellation separately on the first and second received data, transmissions can be re-matched in several iterations where transmitted data differs between transmissions. In this way, incremental redundancy HARQ can be used in the interference cancellation process, which results in a solution which is a significant improvement over what is known in the art.

The steps of performing interference cancellation on the first received data and second received data may comprise: regenerating, from the set of soft information bit estimates, estimates corresponding to the first received data and second received data; adding, to the first received data in the antenna buffer, a difference between the regenerated estimate corresponding to the first received data from the current iteration and the regenerated estimate corresponding to the first received data from a previous iteration; and adding, to the second received data in the antenna buffer, a difference between the regenerated estimate corresponding to the second received data from the current iteration and the regenerated estimate corresponding to the second received data from a previous iteration.

The method may be repeated for an arbitrary number of transmissions until either the data is correctly decoded or the predefined maximum number of transmissions is reached.

The method may be performed independently for decoding a plurality of concurrent transmissions from a plurality of transmitters using a common antenna buffer. This provides multi-stage soft interference cancellation which can be exploited when detecting multiple transmitter signals over multiple concurrent transmissions from multiple transmitters. This provides better exploitation of available soft information over multiple re-transmissions, and from multiple transmitters, than techniques from the prior art.

The concurrent transmissions may relate to different users.

The interference cancellation may optionally only be performed when the set of binary bits has been determined to have been incorrectly decoded.

The step of decoding may comprise using forward error correction.

The method may end after a predetermined number of iterations, even when the set of soft information bit estimates is determined to have been incorrectly decoded.

Each soft coded bit estimate and each soft information bit estimate may be a number representing the probability of the corresponding bit being zero or one.

The method may further comprise the step of: regenerating, from the set of soft information bit estimates, symbol estimates corresponding to the first and second transmissions, respectively, and storing the regenerated symbol estimates in a symbol memory. The steps of regenerating estimated received data may comprise storing the regenerated estimated received data in a sample memory; and the steps of converting a set of received symbols to a set of soft coded bit estimates may include the addition of regenerated symbol estimates from the previous iteration, where available, from the symbol memory.

The second transmission may be a result of a failure to decode the first transmission by itself.

The step of combining may comprise re-matching the first set of soft coded bit estimates and the second set of soft coded bit estimates to obtain the combined set of soft coded bit estimates.

The method may further comprise the steps, prior to the step of deriving a first set of received symbols, of: receiving the first received data and storing the first received data in the antenna buffer; and receiving the second received data and storing the second received data in the antenna buffer. The steps of receiving the first received data and receiving the second received data may in that not be repeated when other steps in the method are repeated.

According to a second aspect, it is presented a receiver device for decoding transmissions of a set of coded information bits from a transmitter. The receiver device comprises: an antenna buffer; deriver arranged to derive a first set of received symbols from first received data corresponding to a first transmission and a second set of received symbols from second received data corresponding to a second transmission, the first and second received data being stored in the antenna buffer; a converter arranged to convert the first set of received symbols to a first set of soft coded bit estimates and the second set of received symbols to a second set of soft coded bit estimates; a combiner arranged to combine the first set of soft coded bit estimates and the second set of soft coded bit estimates to a set of combined soft coded bit estimates; a decoder arranged to decode the set of combined soft coded bit estimates to a single set of soft information bit estimates; a bit converter the set of soft information bit estimates to a set of binary bits; a determiner arranged to determine whether the set of soft information bit estimates has been correctly or incorrectly decoded; and an interference canceller arranged to perform interference cancellation on the first and second received data, respectively, in the antenna buffer.

The receiver device may be arranged to operate to decode the set of coded information bits repeatedly for an arbitrary number of transmissions until either the data is correctly decoded or the predefined maximum number of transmissions is reached.

According to a third aspect, it is presented a radio network node comprising a receiver device according to the second aspect.

According to a fourth aspect, it is presented a mobile communication terminal comprising a receiver device according to the second aspect.

It is to be noted that any feature of the first, second, third and fourth aspects may be form part of any other aspect, where applicable.

Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

BRIEF DESCRIPTION OF THE DRAWINGS

The invention is now described, by way of example, with reference to the accompanying drawings, in which.

DETAILED DESCRIPTION

The invention will now be described more fully hereinafter with reference to the accompanying drawings, in which certain embodiments of the invention are shown. This invention may, however, be embodied in many different forms and should not be construed as limited to the embodiments set forth herein; rather, these embodiments are provided by way of example so that this disclosure will be thorough and complete, and will fully convey the scope of the invention to those skilled in the art. Like numbers refer to like elements throughout the description.

Figure 1:
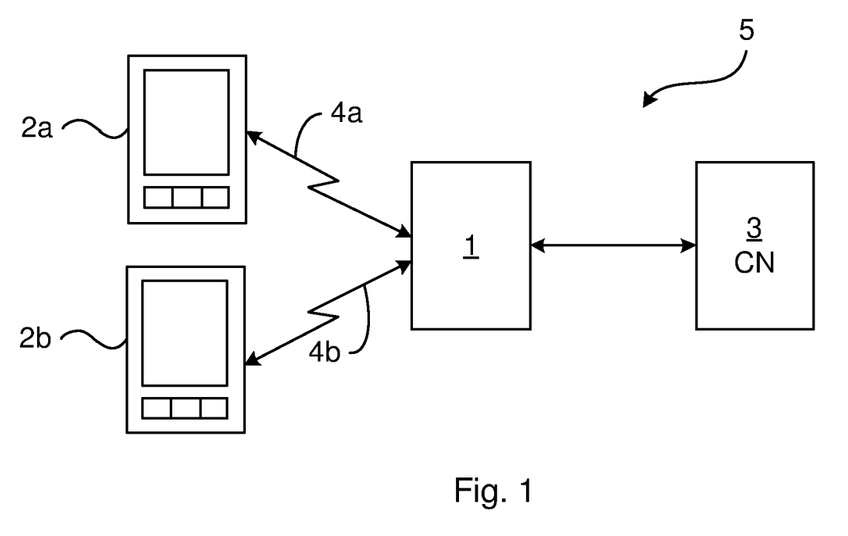
FIG. 1 is a schematic drawing showing an environment where embodiments described herein can be applied.

FIG. 1 is a schematic diagram illustrating a mobile communication network 5 where embodiments presented herein can be applied. The mobile communications network 5 comprises a core network 3 and one or more radio base stations 1, here in the form of enhanced Node Bs 1, also known as e-Node Bs or eNBs. The radio base stations 1 could also be in the form of Node Bs, BTSs (Base Transceiver Stations) and/or BSSs (Base Station Subsystems). The radio base stations 1 provide radio connectivity to a plurality of mobile communication terminals 2a-b over respective radio interfaces 4a-b. The term mobile communication terminal is also known as user equipment, mobile terminal, user terminal, user agent, etc.

The mobile communication network 5 can e.g. comply with LTE (Long Term Evolution), W-CDMA (Wideband Code Division Multiple Access), etc., as long as the principles described hereinafter are applicable.

The radio base stations 1 are connected to the core network 3 for connectivity to central functions and other networks.

Figure 2A:
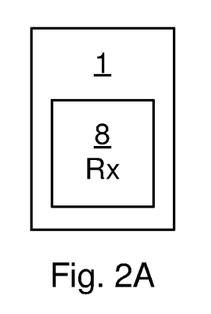
FIGS. 2A-B are schematic drawings showing a receiver device implemented in a mobile communication terminal and a network node, respectively.
Figure 2B:
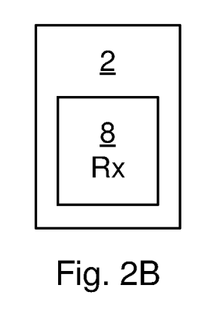

FIGS. 2A-B are schematic drawings showing a receiver device implemented in a mobile communication terminal and a network node, respectively. Embodiments presented herein relate to decoding transmissions received from a transmitter. In FIG. 2A, a receiver device 8 is provided in a network node, here in the form of a radio base station 1, such as the radio base station of FIG. 1. In FIG. 2B, a receiver device 8 is provided in a mobile communication terminal 2, such as one or both of the mobile communication terminals 2a-b of FIG. 1.

Figure 3A:
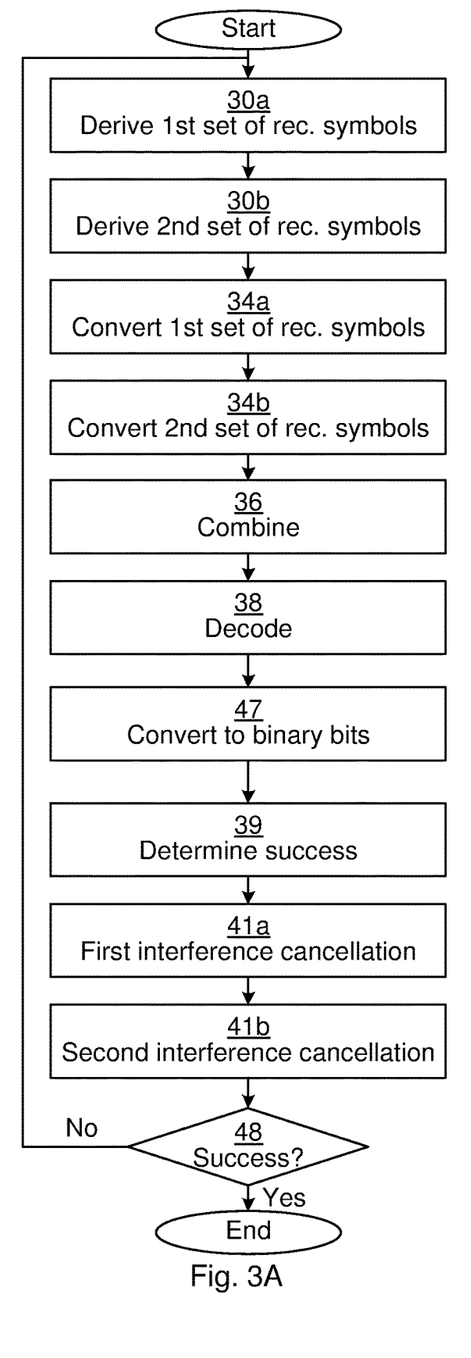
FIGS. 3A-B are flow charts illustrating methods which are executed in the receiver device of FIGS. 2A-B.
Figure 3B:
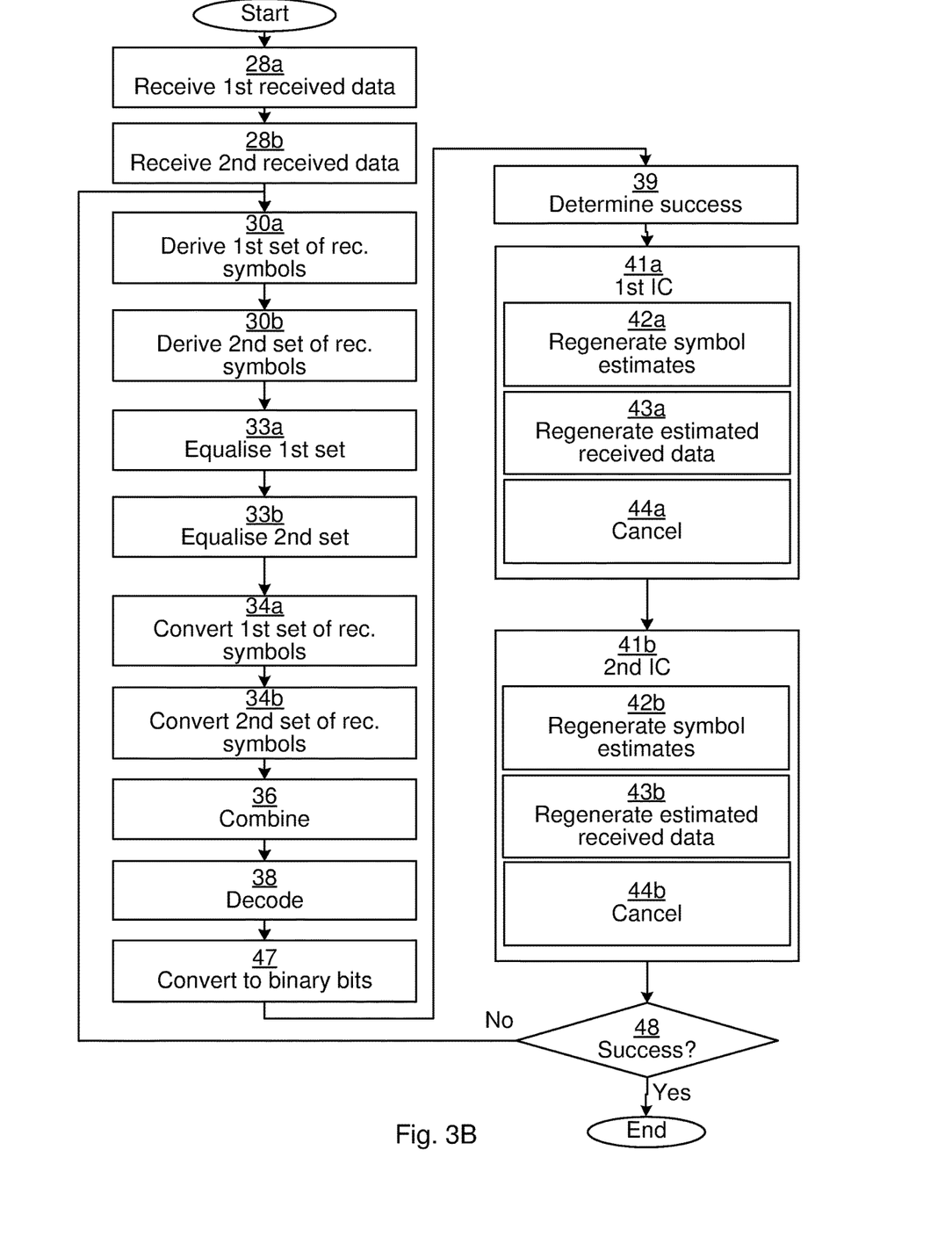

FIGS. 3A-B are flow charts illustrating methods which are executed in the receiver device 8 of FIGS. 2A-B. The purpose of the method is to decode transmissions of a set of coded information bits from a transmitter. The flow chart of FIG. 3A is described first.

In a derive first set of received symbols step 30a, a first set of received symbols is derived from first received data corresponding to a first transmission. The first received data has previously been received over radio and the first received data is stored in an antenna buffer of the receiver device. Each symbol is a complex numerical representation of a waveform of fixed time duration, whereby there exists a one-to-one mapping between each waveform in a set of possible waveforms in that fixed time duration and a finite set of bits.

In W-CDMA, for example, this step can include pulse-shape filtering, downsampling, descrambling and despreading to obtain the first set of received symbols.

In LTE, for example, this step can include cycle prefix removal and an FFT (Fast Fourier Transform) step.

In a derive second set of received symbols 30b, a second set of received symbols is derived from second received data corresponding to a second transmission. Just like for the first received data, the second received data is stored in the antenna buffer. The second transmission relates to the same underlying set of information bits as the first transmission. In other words, the second transmission is a HARQ retransmission from the transmitter after the receiver device failed to correctly decode the information bits using only the first transmission.

In a convert first set of received symbols step 34a, the first set of received symbols is converted to a first set of soft coded bit estimates. In other words, each symbol is converted to one or more bit estimates, where each bit estimate is soft coded. This implies that the bit estimate is not a binary zero or one, but rather a number which represents how likely it is that each coded bit is a zero or a one.

In a convert second set of received symbols step 34b, the second set of received symbols is converted to a second set of soft coded bit estimates in the same way that is done in the convert first set of received symbols step 34a.

In a combine step 36, the first set of soft coded bit estimates and the second set of soft coded bit estimates are combined to a combined set of soft coded bit estimates. This combining is generally a re-matching (including, for example, unpuncturing) procedure which involves the interspersing into the HARQ buffer of the soft coded bit estimates from each transmission set, in their correct placement in time in accordance with the corresponding opposite process (rate matching, including, for example, puncturing) at the transmitter side. In the case where the placement of estimates overlaps in time in both transmissions sets, the combiner adds together the estimates for these overlapping placements.

In a decode step 38, the combined set of soft coded bit estimates are decoded to a set of soft information bit estimates. Just like for the soft coded bit estimates, the soft coded information bit estimates are soft coded bits, but here for decoded bits, here denoted information bits. The decoding is performed in accordance with the encoding previously performed on the transmitter side, and thus employs decoding equivalent to channel coding on the transmitter side. For example, forward error correction (FEC) is applied in this step.

In a convert to binary bits step 47, the set of soft information bit estimates are converted to a set of binary bits, i.e. each bit is either exactly zero or exactly one.

In a determine success step 39, it is determined whether the set of binary bits has been correctly or incorrectly decoded. This is done by checking an error detecting code, such as Cyclic Redundancy Check (CRC).

In a first interference cancellation step 41a, interference cancellation is applied to the first received data in the antenna buffer. It is to be noted that cancellation is here to be interpreted as an attempt to cancel, and may or may not be completely effective at each cancellation iteration.

In a second interference cancellation step 41b, interference cancellation is applied to the second received data in the antenna buffer.

The steps to derive a first set of received symbols and to derive a second set of received symbols, and all subsequent steps, are then repeated using the current (cancelled) contents of the antennas buffer; this repetition shall be termed here an iteration.

In a conditional success step 38, the method ends when either the set of binary bits has been correctly decoded (as determined in the determine success step 39) or a predefined maximum number of iterations is reached. Otherwise, the method returns to the derive first set of received symbols step 30a.

FIG. 3B is a flow chart illustrating an embodiment of a method for decoding transmissions of a set of coded information bits from a transmitter. The steps of the method of FIG. 3A have equivalents in FIG. 3B and are only mentioned again when the methods differ in such a step.

In a receive first received data step 28a, the first received data is received and stored in the antenna buffer.

In a receive second received data step 28b, the second received data is received and stored in the antenna buffer.

In an optional equalise first set step 33a, the first set of received symbols are equalised using channel equalisation.

Analogously, in an optional equalise second set step 33b, the second set of received symbols are equalised using channel equalisation.

The steps 34a-b of converting a set of received symbols to a set of soft coded bit estimates includes the addition of regenerated symbol estimates from the previous iteration from a symbol memory, on all iterations except the first iteration.

Optionally, the combine step 36 comprises re-matching the first set of soft coded bit estimates and the second set of soft coded bit estimates to obtain the combined set of soft coded bit estimates. This is applicable both to incremental redundancy HARQ and chase combining HARQ, where the two sets of soft coded bit estimates are combined. See below with reference to FIG. 6 for further explanation on incremental redundancy HARQ.

The first interference cancellation step 41a here comprises a regenerate symbol estimates step 42a, followed by a regenerate estimated received data step 43a and a cancel step 44a.

In the regenerate symbol estimates step 42a, the first symbol estimate is regenerated based on the set of soft information bit estimates and an updated set of soft coded bit estimates are obtained; both sets are outputs of the decoder. The regenerated symbol estimate is also stored in the symbol memory.

The first symbol estimate is regenerated based on both the set of soft information bit estimates and updated soft coded bit estimates, which are both produced by the decoder in the decode step 38, but won't necessarily be the same on both transmissions. They might indeed be quite different, e.g. if incremental redundancy HARQ is used, because different data is sent in the two transmissions and the soft information about these values will be quite different.

These soft information bits and soft coded bits are mapped onto soft symbols, and if the soft bits are different, the soft symbols will be different.

Nevertheless, as explained in more detail with reference to FIG. 6 below, there is a common underlying set of hard information bits associated with both first and second transmissions.

In the regenerate estimated received data step 43a, a set of received data estimates corresponding to the first transmission is regenerated from the set of regenerated symbol estimates, then the estimated channel distortion corresponding to the time interval of this set is re-applied to the set of estimates. This effectively reverses the channel equalisation.

The set of regenerated received data estimates corresponding to the first received data is stored in a sample memory, which is distinct from the antenna buffer.

In the cancel step 44a, a set of difference values is first calculated between the set of regenerated estimates corresponding to the first received data from the current iteration and the set of regenerated estimates corresponding to the first received data from the previous iteration. This set of difference values is then added to the first received data in the antenna buffer.

The second interference cancellation step 41b comprises steps equivalent to the first interference cancellation step 41a, i.e. a regenerate symbol estimates step 42b, a regenerate estimated received data step 43b and a cancel step 44b, but which are applied for data corresponding to the second transmission.

Using the methods described herein, the method can be performed independently for decoding a plurality of concurrent transmissions from a plurality of transmitters using a common antenna buffer. In this way, interference between concurrent users can be reduced significantly. It is to be noted that the method is not limited to two transmission time intervals. The transmitter could in theory be instructed to keep re-sending an infinite number of times. In practice, however, there is always some latency constraint on the transmission being decoded successfully, whereby the number of transmissions are limited. In such a situation the transmission could be declared as a 'lost' transmission and higher layers would act appropriately.

Optionally, the interference cancellation is only performed when the set of binary bits are incorrectly decoded, as determined in the determine success step 39.

Figure 4A:
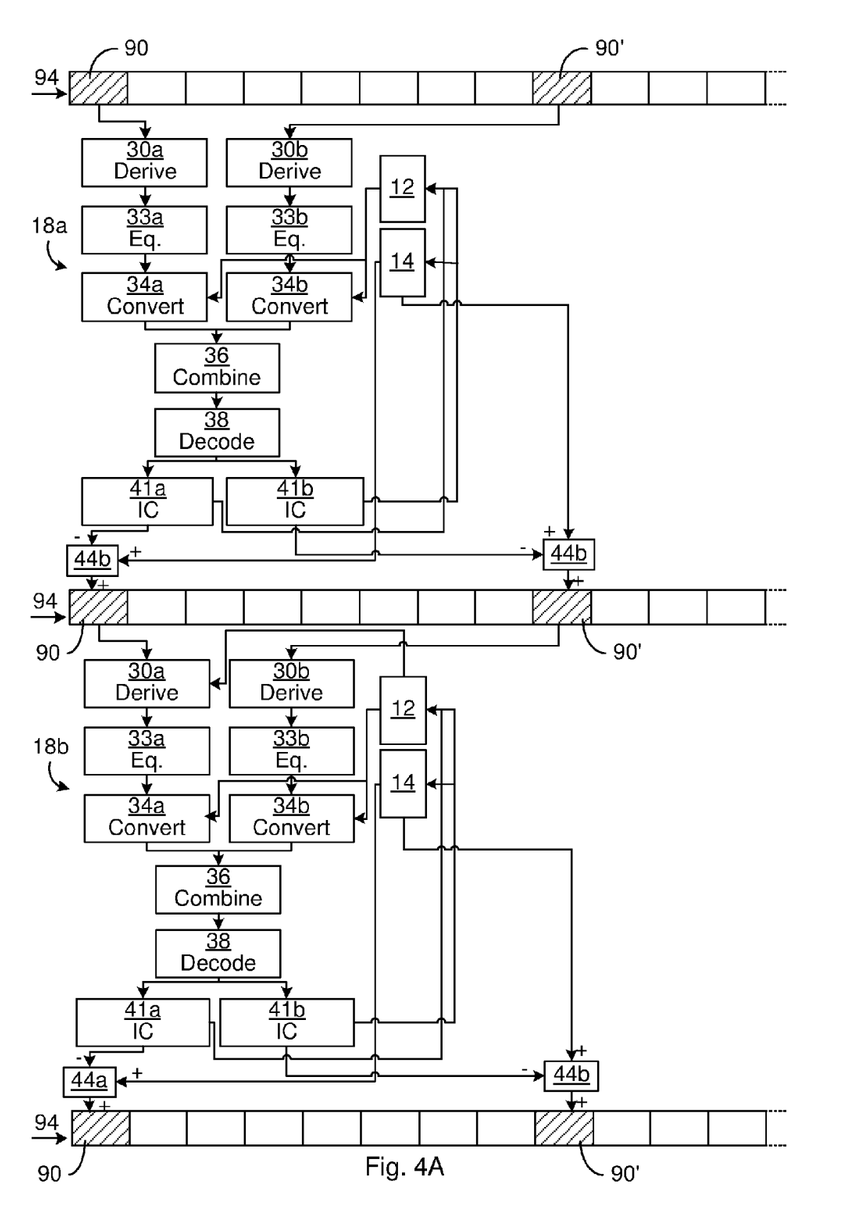
FIG. 4A is a schematic diagram illustrating more graphically the function of the methods of FIGS. 3A-B for a situation where transmissions are received from a single transmitter.

FIG. 4A is a schematic diagram illustrating more graphically the function of the methods of FIGS. 3A-B for a situation where transmissions are received from a single transmitter. FIG. 4A relates also to a situation where transmissions are received from one transmitter.

An antenna buffer 94 contains the received data in a form from which the received symbols are derivable. In this example, it is highlighted received data 90 corresponding to a first transmission and received data 90' corresponding to a second transmission. Both the first and second transmissions relate to the same original information bits.

The diagram shows a first iteration 18a and a second iteration 18b, working on data from the same received data 90, 90' corresponding to the first and second transmissions.

Looking at the first iteration 18a, the derive steps 30a-b, equalise steps 33a-b, convert steps 34a-b, combine step 36, decode step 38, interference cancellation steps 41a-b and cancel steps 44a-b correspond to the steps shown in FIGS. 3A-B, but the flow of data, being separate or combined for the two transmissions, is here shown more graphically.

Moreover, the symbol memory 12 and the sample memory 14 are shown. As described above, the symbol memory 12 is populated with the respective regenerated symbol estimates being a result of the regenerate symbol estimate steps 42a-b. The content of the symbol memory is then used in a subsequent iteration in the convert steps 34a-b. In other words, the signal containing residual interference is passed through the detector, but regenerated symbols from the previous iteration are added back into the convert steps 34a-b to compensate for the removal of the signal at the cancel step.

As a result of the regenerate estimated received data steps 43a-b (FIG. 3B), part of the interference cancellation steps 41a-b, the regenerated received data estimate corresponding to the first received data is stored in a sample memory. This sample memory data is subsequently used in the next iteration in the cancellation steps 44a-b to undo the last cancellation.

It is to be noted that the process described above can be repeated for more received transmissions from the same transmitter, either until the information bits have been correctly decoded or until a predetermined number of transmissions have been received.

Figure 4B:
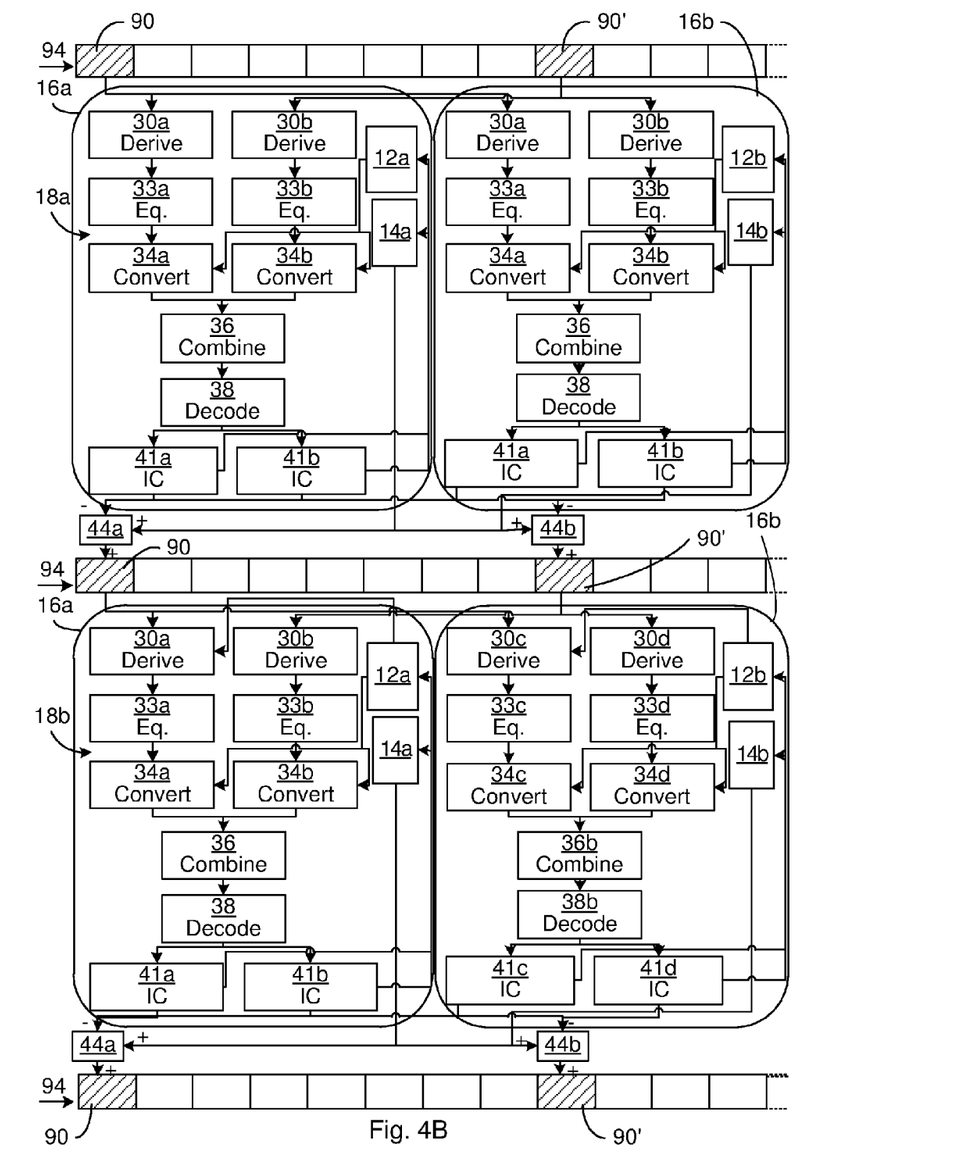
FIG. 4B is a schematic diagram illustrating more graphically the function of the methods of FIGS. 3A-B for a situation where transmissions are received from two transmitters.

FIG. 4B is a schematic diagram illustrating more graphically the function of the methods of FIGS. 3A-B for a situation where transmissions are received from two transmitters. As explained above, the two transmitters can relate to two user (or user groups). The respective two transmissions from the two transmitters overlap in time and are thus stored in the antenna buffer 94, superposed, within the received signal. Note that the receiver cannot differentiate between the two received signals from the two transmitters before the detection and decoding process comprising steps 30a to 38 has begun. With reference to FIG. 4B, two transmissions from the two transmitters are received and stored in the antenna buffer during time interval 90, and two later re-transmissions from the two transmitters are received and stored in the antenna buffer during time interval 90'. The process can further be extended to received transmissions from more transmitters, even if FIG. 4B shows the example with receiving transmissions from two transmitters. FIG. 4B thus shows a first iteration 16a and second iteration 16c to decode the coded information bits from the first transmitter, as well as a first iteration 16b and second iteration 16d to decode the coded information bits from the second transmitter.

The process is similar to the one shown for receiving transmissions from one transmitter. However, it is to be noted that there are separate symbol memories 12a-b and sample memories 14a-b for the two respective transmitters.

This method provides multi-stage soft interference cancellation which can be exploited when detecting multiple transmitter signals over multiple concurrent transmissions from multiple transmitters. This provides better exploitation of available soft information over multiple re-transmissions, and from multiple transmitters, than techniques from the prior art.

In other words, both transmitters result in regeneration and cancellation of both their current AND previous retransmissions with maintained integrity of previous transmissions. The method presented has at least two benefits compared with existing methods:

Firstly, the current detection processes for all concurrent transmissions will benefit from the other transmitter interference cancelled in the previous transmissions, since the previous transmissions act as an input to the concurrent detection processes (steps 30-34) (i.e. those belonging to all concurrent transmissions), at each interference cancellation iteration.

Secondly, if any of the detection processes for any of the concurrent transmissions detect a NACK in the current decoding processes, detection of future retransmissions for either concurrent transmission will benefit from the other transmitter interference cancelled in the previous transmissions, again because the previous transmissions act as an input to detection of all concurrent detection processes at each interference cancellation iteration.

Figure 5:
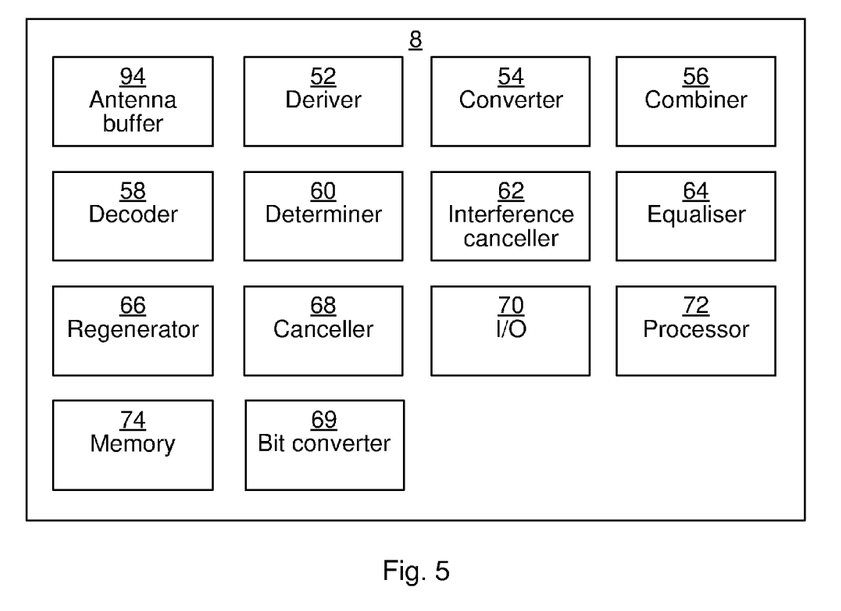
FIG. 5 is a schematic diagram illustrating modules of the receiver device of FIGS. 2A-B.

FIG. 5 is a schematic diagram illustrating modules of the receiver device 8 of FIGS. 2A-B. The modules can be implemented using software such as a computer program executing in the receiver device 8 or in its host device, such as the network node 1 or the mobile communication terminal 2. When implemented in software, each module depends on an execution environment which utilises a processor 72, a computer program product 74 and an I/O interface 70. The modules correspond to the methods as described with reference to FIGS. 3A-B.

The antenna buffer 94 is arranged to store received data, received over the radio interface, after an A/D conversion. The received data can e.g. be stored as sets of complex numbers.

A deriver 52 is arranged to derive a first set of received symbols from first received data corresponding to a first transmission and a second set of received symbols from second received data corresponding to a second transmission.

A converter 54 is arranged to convert the first set of received symbols to a first set of soft coded bit estimates and the second set of received symbols to a second set of soft coded bit estimates.

A combiner 56 is arranged to combine the first set of soft coded bit estimates and the second set of soft coded bit estimates to a set of combined soft coded bit estimates.

A decoder 58 is arranged to decode the set of combined soft coded bit estimates to a single set of soft information bit estimates.

A bit converter 59 is arranged to convert the set of soft information bit estimates to a set of binary bits.

A determiner 60 arranged to determine whether the set of soft information bit estimates has been correctly or incorrectly decoded.

An interference canceller 62 is arranged to perform interference cancellation on the first and second received data, respectively, in the antenna buffer.

An optional equaliser 64 can be used to perform channel equalisation on the first set of received symbols and the second set of received symbols.

An optional regenerator 66 can be arranged to regenerate, from the set of soft information bit estimates, estimates corresponding to the first received data and second received data.

A optional canceller 68 is arranged to determine a difference between the regenerated estimate corresponding to the first received data from the current iteration and the regenerated estimate corresponding to the first received data from a previous iteration. This difference is then added to the first received data in the antenna buffer. The canceller 68 performs the corresponding processing in relation to the second received data.

A processor 72 is provided, either in the receiver device 8 itself or in its host device (not shown), using any suitable central processing unit (CPU), multiprocessor, pool of processors, microcontroller, digital signal processor (DSP), application specific integrated circuit etc., capable of executing software instructions stored in a computer program product 74, e.g. in the form of a memory. The computer program product 74 can be a memory or any combination of read and write memory (RAM) and read only memory (ROM). The memory also comprises persistent storage, which, for example, can be any single one or combination of magnetic memory, optical memory, solid state memory or even remotely mounted memory. The computer program product 74 can also be part of the receiver device 8 itself or the host device (i.e. the network node 1 or mobile communication terminal of FIGS. 2A-B).

The receiver device 8, either in the receiver device 8 itself or in its host device, further comprises an I/O interface 70 for communicating with the core network and optionally with other network nodes.

Figure 6:
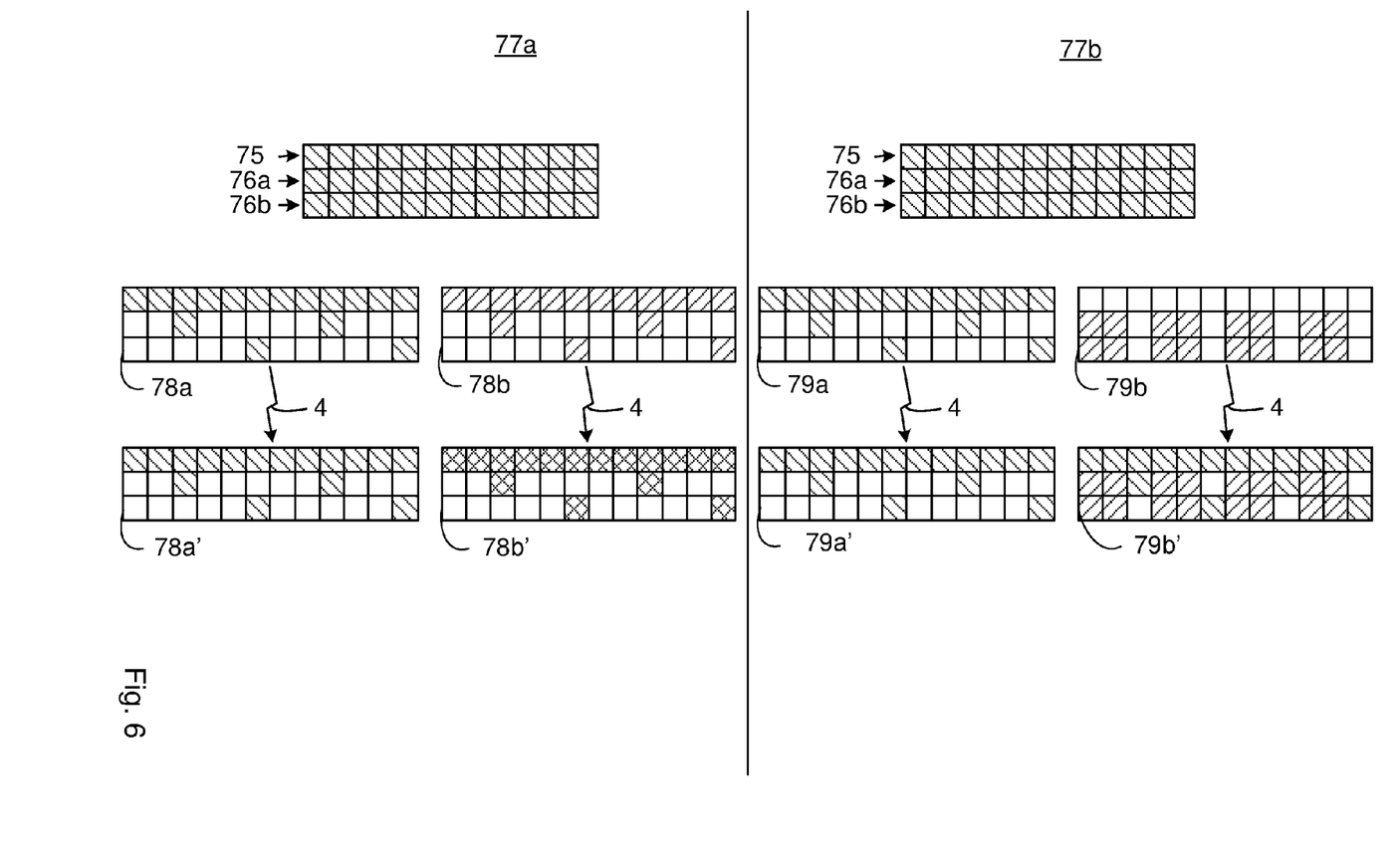
FIG. 6 is a schematic diagram illustrating chase combining HARQ and incremental redundancy HARQ.

FIG. 6 is a schematic diagram illustrating examples of chase combining HARQ (Hybrid automatic repeat request) and incremental redundancy HARQ for a rate ⅓ error correcting code. The left side of the diagram illustrates chase combining HARQ 77a and the right side of the diagram illustrates incremental redundancy HARQ 77b.

Looking first at chase combining HARQ 77a, at the top, the information bits 75 are shown. A first set 76a and a second set 76b of parity bits are generated to allow error correction.

A first set 78a of transmission bits 78a is generated from the information bits 75 and the first and second sets 76a-b of parity bits through a process called rate matching or puncturing, i.e. selecting a subset of the information and parity bits. In this illustrative example, the resulting first set 78a of transmission bits comprises all information bits 75 and a subset of the first and second sets 76a-b of parity bits, although this doesn't necessarily have to be the case.

The first set 78a of transmission bits are transmitted over the radio interface 4 and the receiver device receives a first set 78a' of received transmission bits 78a', which comprises any interference, noise, etc.

If, for some reason, the receiver device determines that the information bits have been incorrectly decoded, the transmitter prepares a second set 78b of transmission bits and transmits these of the radio interface 4. In chase combining HARQ, the second set 78b of transmission bits covers the same bits as the first set 78a of transmission bits. The receiver device derives a second set 78b' of soft coded bit estimates from the second transmission and combines (re-matches) them with the soft coded bit estimates of the first transmission; this re-matching involves establishing estimates in their correct time placement according to their position in the total transmitter encoding generation set, and performing a simple addition where multiple estimates overlap in their time placement. However, since in chase combining, the two transmissions correspond to exactly the same subsets of the total encoder generation set, the two subsets overlap completely in time at the soft coded bit level, and are simply added together. This addition of soft estimates over two transmissions results in more energy being received for each bit, in relation to noise, interference, etc., whereby successful decoding is more likely than if a single transmission was decoded by itself. The process can be repeated for more transmissions if necessary.

Looking now to incremental redundancy HARQ 77b, the first set 79a of transmission bits correspond to the first set 78a of transmission bits for chase combining HARQ 77a.

The first set 79*a* of transmission bits is transmitted over the radio interface 4 and the receiver device receives a first set 79*a*' of received transmission bits 78*a*', which comprises any interference, noise, etc.

Also for incremental redundancy HARQ 77*b*, if the receiver device determines that the information bits have been incorrectly decoded, the transmitter prepares a second set 79*b* of transmission bits and transmits these of the radio interface 4. However, in incremental redundancy HARQ, the second set 79*b* of transmission bits is a new subset of bits. As in the case of chase combining HARQ described above, the receiver device derives a second set 79*b*' of soft coded bit estimates by combining (re-matching) the estimates in their correct time placement according to their position in the total encoder generation set. Here, however, a greater proportion of the total set of available information bits and parity bits are received over both transmissions than is the case with chase combining, such that error correction is more likely to be successful on detection of the second transmission than is the case with chase combining. The process can be repeated for more transmissions if necessary.

It can be seen that for incremental redundancy HARQ 77*b* to work, the receiver device needs to be able to re-match transmissions which differ in coded bit content, and therefore symbol content, which embodiments presented herein allow for.

The invention has mainly been described above with reference to a few embodiments. However, as is readily appreciated by a person skilled in the art, other embodiments than the ones disclosed above are equally possible within the scope of the invention, as defined by the appended patent claims.

The invention claimed is:

1. A method, performed in a receiver device, for decoding a plurality of concurrent transmissions of sets of coded information bits from a plurality of transmitters using a common antenna buffer, the method being performed independently for each transmitter, for a set of coded information bits, wherein the method comprises performance of operations comprising:
   (a) deriving a first set of received symbols from first received data corresponding to a first concurrent transmission of the plurality of concurrent transmissions, the first received data being stored in the common antenna buffer;
   (b) deriving a second set of received symbols from second received data corresponding to a second concurrent transmission of the plurality of concurrent transmissions, the second received data being stored in the common antenna buffer, wherein the first received data and the second received data are stored in the common antenna buffer as superimposed data;
   (c) converting the first set of received symbols to a first set of soft coded bit estimates;
   (d) converting the second set of received symbols to a second set of soft coded bit estimates;
   (e) combining the first set of soft coded bit estimates and the second set of soft coded bit estimates to a combined set of soft coded bit estimates;
   (f) decoding the combined set of soft coded bit estimates to a set of soft information bit estimates;
   (g) converting the set of soft information bit estimates to a set of binary bits;
   (h) determining whether the set of binary bits has been correctly or incorrectly decoded;
   (i) performing interference cancellation on the first received data in the common antenna buffer;
   (j) performing interference cancellation on the second received data in the common antenna buffer; and
   repeating operations (a)-(j) until either the set of binary bits has been correctly decoded or a predefined maximum number of iterations is reached.

2. A method, performed in a receiver device, for decoding a plurality of concurrent transmissions of sets of coded information bits from a plurality of transmitters using a common antenna buffer, the method being performed independently for each transmitter, for a set of coded information bits, wherein the method comprise performance of operations comprising:
   (a) deriving a first set of received symbols from first received data corresponding to a first transmission, the first received data being stored in the common antenna buffer;
   (b) deriving a second set of received symbols from second received data corresponding to a second transmission, the second received data being stored in the common antenna buffer;
   (c) converting the first set of received symbols to a first set of soft coded bit estimates;
   (d) converting the second set of received symbols to a second set of soft coded bit estimates;
   (e) combining the first set of soft coded bit estimates and the second set of soft coded bit estimates to a combined set of soft coded bit estimates;
   (f) decoding the combined set oft coded bit estimates to a set of soft information bit estimates;
   (g) converting the set of soft information bit estimates to a set of binary bits;
   (h) determining whether the set of binary bits has been correctly or incorrectly decoded;
   (i) performing interference cancellation on the first received data in the common antenna buffer;
   (j) performing interference cancellation on the second received data in the common antenna buffer; and
   repeating operations (a)-(j) until either the set of binary bits has been correctly decoded or a predefined maximum number of iterations is reached,
   wherein the performing of the interference cancellation on the first received data and second received data comprises:
   regenerating, from the set of soft information bit estimates, estimates corresponding to the first received data and second received data, resulting in a regenerated estimate corresponding to the first received data from a current iteration of the operations (a)-(j) and a regenerated estimate corresponding to the second received data from the current iteration;
   adding, to the first received data in the common antenna buffer, a difference between the regenerated estimate corresponding to the first received data from the current iteration and a regenerated estimate corresponding to the first received data from a previous iteration of the operations (a)-(j); and
   adding, to the second received data in the common antenna buffer, a difference between the regenerated estimate corresponding to the second received data from the current iteration and a regenerated estimate corresponding to the second received data from the previous iteration.

3. The method according to claim 1, wherein the operations (a)-(j) are repeated for an arbitrary number of transmissions until either a correct decoding occurs or a predefined maximum number of transmissions is reached.

4. The method according to claim 1, wherein the plurality of the concurrent transmissions of sets of coded information bits relate to different users.

5. The method according to claim 1, wherein the interference cancellation is only performed when the set of binary bits has been determined to have been incorrectly decoded.

6. The method according to claim 1, wherein the decoding of the combined set of soft coded bit estimates to the set of soft information bit estimates comprises using forward error correction.

7. The method according to claim 1, further comprising:
equalising the first set of received symbols; and
equalising the second set of received symbols.

8. The method according to claim 1, wherein the repeating of the operations (a)-(j) ends after a predetermined number of iterations, irrespective of whether the set of soft information bit estimates is determined to have been incorrectly decoded.

9. The method according to claim 1, wherein each soft coded bit estimate and each soft information bit estimate is a number representing a probability of a corresponding bit being zero or one.

10. The method according to claim 2, further comprising:
regenerating, from the set of soft information bit estimates, symbol estimates corresponding to the first and second transmissions, respectively, and storing the symbol estimates in a symbol memory;
wherein the regenerating the estimates corresponding to the first received data and second received data comprises storing the regenerated estimate corresponding to the first received data and the regenerated estimate corresponding to the second received data in a symbol memory; and
wherein the converting the first set of received symbols to the first set of soft coded bit estimates includes addition of symbol estimates from the previous iteration, if available, from the symbol memory.

11. The method according to claim 1, wherein the second concurrent transmission is a result of a failure to decode the first concurrent transmission by itself.

12. The method according to claim 1, wherein the step of combining comprises re-matching the first set of soft coded bit estimates and the second set of soft coded bit estimates to obtain the combined set of soft coded bit estimates.

13. The method according to claim 1, further comprising, prior to deriving the first set of received symbols:

receiving the first received data and storing the first received data in the common antenna buffer; and
receiving the second received data and storing the second received data in the common antenna buffer;
wherein the steps of receiving the first received data and receiving the second received data are not repeated when other steps in the method are repeated.

14. A receiver device for decoding a plurality of concurrent transmissions of sets of coded information bits from a plurality of transmitters independently for each transmitter, for a set of coded information bits, the receiver device comprising:
a common antenna buffer;
a deriver arranged to derive a first set of received symbols from first received data corresponding to a first transmission and a second set of received symbols from second received data corresponding to a second transmission, wherein the first and second received data are stored in the common antenna buffer as superimposed data;
a converter arranged to convert the first set of received symbols to a first set of soft coded bit estimates and the second set of received symbols to a second set of soft coded bit estimates;
a combiner arranged to combine the first set of soft coded bit estimates and the second set of soft coded bit estimates to a set of combined soft coded bit estimates;
a decoder arranged to decode the set of combined soft coded bit estimates to a single set of soft information bit estimates;
a bit converter arranged to decode the single set of soft information bit estimates to a set of binary bits;
a determiner arranged to determine whether the single set of soft information bit estimates has been correctly or incorrectly decoded; and
an interference canceller arranged to perform interference cancellation on the first and second received data, respectively, in the common antenna buffer.

15. The receiver device according to claim 14, wherein the receiver device is arranged to operate to decode the set of coded information bits repeatedly for an arbitrary number of transmissions until either a correct decoding occurs or a predefined maximum number of transmissions is reached.

16. A radio network node comprising a receiver device according to claim 14.

17. A mobile communication terminal comprising a receiver device according to claim 14.

* * * * *